United States Patent
Boyle et al.

(10) Patent No.: US 8,347,039 B2
(45) Date of Patent: Jan. 1, 2013

(54) PROGRAMMABLE STREAM PREFETCH WITH RESOURCE OPTIMIZATION

(75) Inventors: Peter Boyle, Edinburgh (GB); Norman Christ, New York, NY (US); Alan Gara, Yorktown Heights, NY (US); Robert Mawhinney, New York, NY (US); Martin Ohmacht, Yorktown Heights, NY (US); Krishnan Sugavanam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 12/684,693

(22) Filed: Jan. 8, 2010

(65) Prior Publication Data

US 2011/0173397 A1    Jul. 14, 2011

(51) Int. Cl.
  *G06F 12/08* (2006.01)
(52) U.S. Cl. .................................. 711/137; 711/E12.057
(58) Field of Classification Search .................. 711/137, 711/E12.057; 710/313, 309
  See application file for complete search history.

(56) References Cited

U.S. PATENT DOCUMENTS

| | | | | |
|---|---|---|---|---|
| 5,317,718 A | * | 5/1994 | Jouppi | 711/137 |
| 5,958,040 A | * | 9/1999 | Jouppi | 712/207 |
| 7,107,384 B1 | * | 9/2006 | Chen et al. | 710/309 |
| 2009/0003344 A1 | * | 1/2009 | Kumar | 370/392 |
| 2010/0268892 A1 | * | 10/2010 | Luttrell | 711/137 |

* cited by examiner

*Primary Examiner* — Pierre-Michel Bataille
(74) *Attorney, Agent, or Firm* — Scully, Scott, Murphy & Presser, P.C.; Daniel P. Morris, Esq.

(57) ABSTRACT

A stream prefetch engine performs data retrieval in a parallel computing system. The engine receives a load request from at least one processor. The engine evaluates whether a first memory address requested in the load request is present and valid in a table. The engine checks whether there exists valid data corresponding to the first memory address in an array if the first memory address is present and valid in the table. The engine increments a prefetching depth of a first stream that the first memory address belongs to and fetching a cache line associated with the first memory address from the at least one cache memory device if there is not yet valid data corresponding to the first memory address in the array. The engine determines whether prefetching of additional data is needed for the first stream within its prefetching depth. The engine prefetches the additional data if the prefetching is needed.

20 Claims, 2 Drawing Sheets

PROGRAMMABLE STREAM PREFETCH WITH RESOURCE OPTIMIZATION

GOVERNMENT CONTRACT

This invention was Government supported under Contract No. B554331 awarded by Department of Energy. The Government has certain rights in this invention.

CROSS-REFERENCE TO RELATED APPLICATIONS

The present invention is related to the following commonly-owned, co-pending U.S. Patent Applications filed on even date herewith, the entire contents and disclosure of each of which is expressly incorporated by reference herein as if fully set forth herein. U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,190, filed Jan. 8, 2010, for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010, for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, filed on Feb. 1, 2010, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 61/261,269, filed Nov. 13 2009, for "LOCAL ROLLBACK FOR FAULT-TOLERANCE IN PARALLEL COMPUTING SYSTEMS"; U.S. patent application Ser. No. 12/684,860, filed Jan. 8, 2010, for "PAUSE PROCESSOR HARDWARE THREAD UNTIL PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 13/008,602, filed Jan. 18, 2011, for "CACHE DIRECTORY LOOKUP READER SET ENCODING FOR PARTIAL CACHE LINE SPECULATION SUPPORT"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "SUPPORT FOR NON-LOCKING PARALLEL RECEPTION OF PACKETS BELONGING TO A SINGLE MEMORY RECEPTION FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, filed Jan. 10, 2011, for "MULTI-PETASCALE HIGHLY EFFICIENT PARALLEL SUPERCOMPUTER"; U.S. patent application Ser. No. 12/984,252, filed Jan. 4, 2011, for "CACHE WITHIN A CACHE"; U.S. patent application Ser. No. 13/008,502, filed Jan. 18, 2011, for "MULTIPROCESSOR SYSTEM WITH MULTIPLE CONCURRENT MODES OF EXECUTION"; U.S. patent application Ser. No. 13/008,583, filed Jan. 18, 2011, for "READER SET ENCODING FOR DIRECTORY OF SHARED CACHE MEMORY IN MULTIPROCESSOR SYSTEM "; U.S. patent application Ser. No. 12/984,308 filed on Jan. 4, 2011, for "EVICT ON WRITE, A MANAGEMENT STRATEGY FOR A PREFETCH UNIT AND/OR FIRST LEVEL CACHE IN A MULTIPROCESSOR SYSTEM WITH SPECULATIVE EXECUTION"; U.S. patent application Ser. No. 12/984,329 filed Jan. 4, 2011, for "PHYSICAL ALIASING FOR THREAD LEVEL SPECULATION WITH A SPECULATION BLIND CACHE"; 61/293,552, filed Jan. 8, 2010, for "LIST BASED PREFETCH"; U.S. patent application Ser. No. 12/684,172, for "HARDWARE SUPPORT FOR COLLECTING PERFORMANCE COUNTERS DIRECTLY TO MEMORY"; U.S. patent application Ser. No. 13/004,005, filed Jan. 10, 2011, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 12/696,746, filed on Jan. 29, 2010, for "TWO DIFFERENT PREFETCH COMPLEMENTARY ENGINES OPERATING SIMULTANEOUSLY"; U.S. patent application Ser. No. 12/697,015, filed on Jan. 29, 2010, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, filed Mar. 19, 2010, for "EFFICIENCY OF STATIC CORE TURN-OFF IN A SYSTEM-ON-A-CHIP WITH VARIATION "; U.S. patent application Ser. No. 12/697,043, Jan. 29, 2010, for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, for "ATOMICITY: A MULTI-PRONGED APPROACH "; U.S. patent application Ser. No. 12/697,175, filed Jan. 29, 2010 for "I/O ROUTING IN A MULTIDIMENSIONAL TORUS NETWORK"; U.S. patent application Ser. No. 12/684,287, filed Jan. 8, 2010 for ARBITRATION IN CROSSBAR FOR LOW LATENCY; U.S. patent application Ser. No. 12/684,630, filed Jan. 8, 2010, for "EAGER PROTOCOL ON A CACHE PIPELINE DATAFLOW"; U.S. patent application Ser. No. 12/723,277, filed Mar. 12, 2010 for EMBEDDED GLOBAL BARRIER AND COLLECTIVE IN A TORUS NETWORK; U.S. patent application Ser. No. 12/696,764, filed Jan. 29, 2010 for "GLOBAL SYNCHRONIZATION OF PARALLEL PROCESSORS USING CLOCK PULSE WIDTH MODULATION"; U.S. patent application Ser. No. 12/796,411, filed Jun. 8, 2010 for "GENERATION-BASED MEMORY SYNCHRONIZATION IN A MULTIPROCESSOR SYSTEM WITH WEAKLY CONSISTENT MEMORY ACCESSES"; U.S. patent application Ser. No. 12/796,389, filed Jun. 8, 2010 for BALANCING WORKLOAD IN A MULTIPROCESSOR SYSTEM RESPONSIVE TO PROGRAMMABLE ADJUSTMENTS IN A SYNCRONIZATION INSTRUCTION; U.S. patent application Ser. No. 12/696,817, filed Jan. 29, 2010 for HEAP/STACK GUARD PAGES USING A WAKEUP UNIT; U.S. patent application Ser. No. 61/293,603, filed Jan. 8, 2010 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475, filed May 5, 2010 for "REPRODUCIBILITY IN A MULTIPROCESSOR SYSTEM".

BACKGROUND

The present application generally relates to a parallel computing system. More particularly, the present application relates to prefetching of data in the parallel computing system.

Prefetching refers to a technique used in a processor to improve processor speed. Traditionally, prefetching places data in a cache memory before the data is needed. Thus, when the data is needed, the data can be provided to the processor more quickly because the data already resides in the cache memory before being requested.

Traditionally, prefetching of data into a cache memory device is a standard method used in processor units to increase performance through a reduction of an average latency for a memory access instruction. The memory access instruction includes, is not limited to: a store instruction, load instruction, etc. Typically, in a parallel computing system, a prefetch engine prefetches a fixed number of data stream with a fixed depth. An example of the parallel computing system includes, but is not limited to: IBM ® (International Business Machines) Blue Gene ®\L or Blue Gene ®\P, etc. A prefetch engine refers to a module performing the prefetching of data and instructions. A (prefetching) depth refers to a certain number of instructions or a certain amount of data to be fetched ahead or refers to a certain number of cache lines to be fetched before they are needed. The data storage in a prefetch engine imposes resource limits on both the depth and number of streams.

The present application discloses improving performance of a parallel computing system, e.g., by prefetching of data or instructions in a plurality of streams while adaptively adjusting prefetching depths of these streams. This enables a prefetch engine to reallocate the storage between the number of streams and the depth of each stream optimally in response to dynamic load. This is particularly advantageous for multi-threaded processors as the number of access streams is more variable.

SUMMARY OF THE INVENTION

The present disclosure describes a system, method and computer program product for prefetching of data or instructions in a plurality of streams while adaptively adjusting prefetching depths of each stream.

Further the adaptation algorithm may constrain that the total depth of all prefetched streams is predetermined and consistent with the available storage resources in a stream prefetch engine.

In one embodiment, there may be provided a method for performing data retrieval in a parallel computing system, the parallel computing system including a plurality of computing nodes, a computing node including at least one processor and at least one cache memory device, the method comprising:

receiving a load request from a processor in the computing node;

evaluating whether a first memory address requested in the load request is present and valid in a first table;

checking whether there exists valid data corresponding to the first memory address in an array in response to determining that the first memory address is present and valid in the table;

inserting the load request in a second table awaiting the valid data to be returned by a cache memory device in the computing node and incrementing a prefetching depth of a stream that the first memory address belongs to in response to determining that there is not yet valid data corresponding to the first memory address in the array;

determining whether prefetching of additional data is needed for the stream; and prefetching the additional data in response to determining that the prefetching is needed.

In one embodiment, there may be provided an apparatus for performing data retrieval in a parallel computing system, the parallel computing system including a plurality of computing nodes, a computing node including at least one processor and at least one cache memory device, the apparatus comprising:

a processor, in the computing node, issuing a load request;

a prefetch unit operable to evaluate whether a first memory address requested in the load request is present and valid in a first table, to check whether there already exists valid data corresponding to the first memory address in a prefetch data array in response to determining that the first memory address is present and valid in the first table, to increment a prefetching depth of a first stream that the first memory address belongs to, to insert the load request in a second table awaiting the valid data to be returned by a cache memory device in the computing node in response to determining that there is not yet valid data corresponding to the first memory address in the prefetch data array, to determine whether prefetching of additional data is needed for the first stream, and to prefetch the additional data in response to determining that the prefetching is needed.

In a further embodiment, the prefetch unit may be further operable to determine a victim stream among streams registered in the first table and to decrement a prefetching depth of the victim stream.

In a further embodiment, the prefetch unit may be further operable to search a least recently used stream having a non-zero depth among the registered streams and to set the least recently used stream as the victim stream for reallocating a prefetching depth of the victim stream.

In a further embodiment, the depth stealing adaptation events will be conditional on a programmable adaptation rate throttling mechanism to control adaptation rates.

In a further embodiment, the total depth across all streams will be programmable and be constrained by the adaptation algorithm to remain as a predetermined value.

In a further embodiment the determination that prefetching is necessary will select the nearest address to the first address that is not present but is a valid address in the table within a prefetching depth of a stream corresponding to the first address.

In a further embodiment, the apparatus may further comprise:

a stream detect engine for detecting the first stream.

BRIEF DESCRIPTION OF THE DRAWINGS

The accompanying drawings are included to provide a further understanding of the present invention, and are incorporated in and constitute a part of this specification.

DETAILED DESCRIPTION

In one embodiment, a stream prefetch engine (e.g., a stream prefetch engine 200 in FIG. 2) increments a prefetching depth of a stream when a load request for the stream has a corresponding address in a prefetch directory (e.g., a PFD 240 in FIG. 2) but the stream prefetch engine has not received corresponding data from a memory device. Upon incrementing the prefetching depth of the stream, the stream prefetch engine decrements a prefetching depth of a victim stream (e.g., a least recently used stream).

In one embodiment, a parallel computing system operates at least one prefetch algorithm as follows:

Stream prefetching: a plurality of concurrent data or instruction streams (e.g., 16 data streams) of consecutive addresses can be simultaneously prefetched with a support up to a prefetching depth (e.g., eight cache lines can be prefetched per stream) with a fully adaptive depth selection. An adaptive depth selection refers to an ability to change a prefetching depth adaptively. A stream refers to sequential data or instructions. An MPEG (Moving Picture Experts Group) movie file or a MP3(MPEG Audio Layer III) music file is an example of a stream.

Data and/or instruction streams can be automatically identified or implied using instructions, or established for any cache miss, e.g., by detecting sequential addresses that cause cache misses.

Stream underflow triggers a prefetching depth increase when the adaptation is enabled. A stream underflow refers to a hit on a cache line that is currently being fetched via a switch or from a memory device. An adaptation refers to changing the prefetching depth.

A sum of all prefetch depths for all streams may be constrained not to exceed the capacity of a prefetch data array. Prefetching depth increases are performed at the expense of a victim stream: a depth of a least recently used stream is decremented to increment a prefetching depth of other stream(s). Hot streams (e.g., fastest streams) may end up with having the largest prefetching depth, e.g., a depth of 8. A prefetch data array refers to an array that stores prefetched data and/or instructions.

Stream replacements and victim streams are selected, for example, using a least recently used algorithm. A victim stream refers to a stream whose depth is decremented. A least recently used algorithm refers to an algorithm discarding the least recently used items first.

In one embodiment, there are provided rules for adaptively adjusting the prefetching depth. These rules may govern a performance of the stream prefetch engine (e.g., a stream prefetch engine 200 in FIG. 2) when dealing with varying stream counts and avoid pathological thrashing of many streams. A thrashing refers to a computer activity that makes little or no progress because a storage resource (e.g., a prefetch data array 235 in FIG. 2) becomes exhausted or limited to perform operations.

Rule 1: a stream may increase its prefetching depth in response to a prefetch to a demand fetch conversion event that is an indicative of bandwidth starvation. A demand fetch conversion event refers to a hit on a line that has been established in a prefetch directory but not yet had data returned from a switch or a memory device. The prefetch directory is described in detail below in conjunction with FIG. 2.

Rule 2: this depth increase is performed at an expense of a victim stream whenever a sum of all prefetching depths equals a maximum capacity of the stream prefetch engine. In one embodiment, the victim stream selected is the least recently used stream with non-zero prefetching depth. In this way, less active or inactive streams may have their depths taken by more competitive hot streams, similar to stale data being evicted from a cache. This selection of a victim stream has at least two consequences: First, that victim's allowed depth is decreased by one. Second, when an additional prefetching is performed for the stream whose depth has been increased, it is possible that all or some prefetch registers may be allocated to active streams including the victim stream since the decrease in the depth of the victim stream does not imply that the actual data footprint of that stream in the prefetch data array may correspondingly shrink. Prefetch registers refer to registers working with the stream prefetch engine. Excess data resident in the prefetch data array for the victim stream may eventually be replaced by new cache lines of more competitive hot streams. This replacement is not necessarily immediate, but may eventually occur.

In one embodiment, there is provided a free depth counter which is non-zero when a sum of all prefetching depths is less than the capacity of the stream prefetch engine. In one embodiment, this counter has value 32 on reset, and per-stream depth registers are reset to zero. These per-stream depth registers store a prefetching depth for each active stream. Thus, the contents of the per-stream depth registers are changed as a prefetching depth of a stream is changed. When a stream is invalidated, its depth is returned to the free depth counter.

Figure 2:
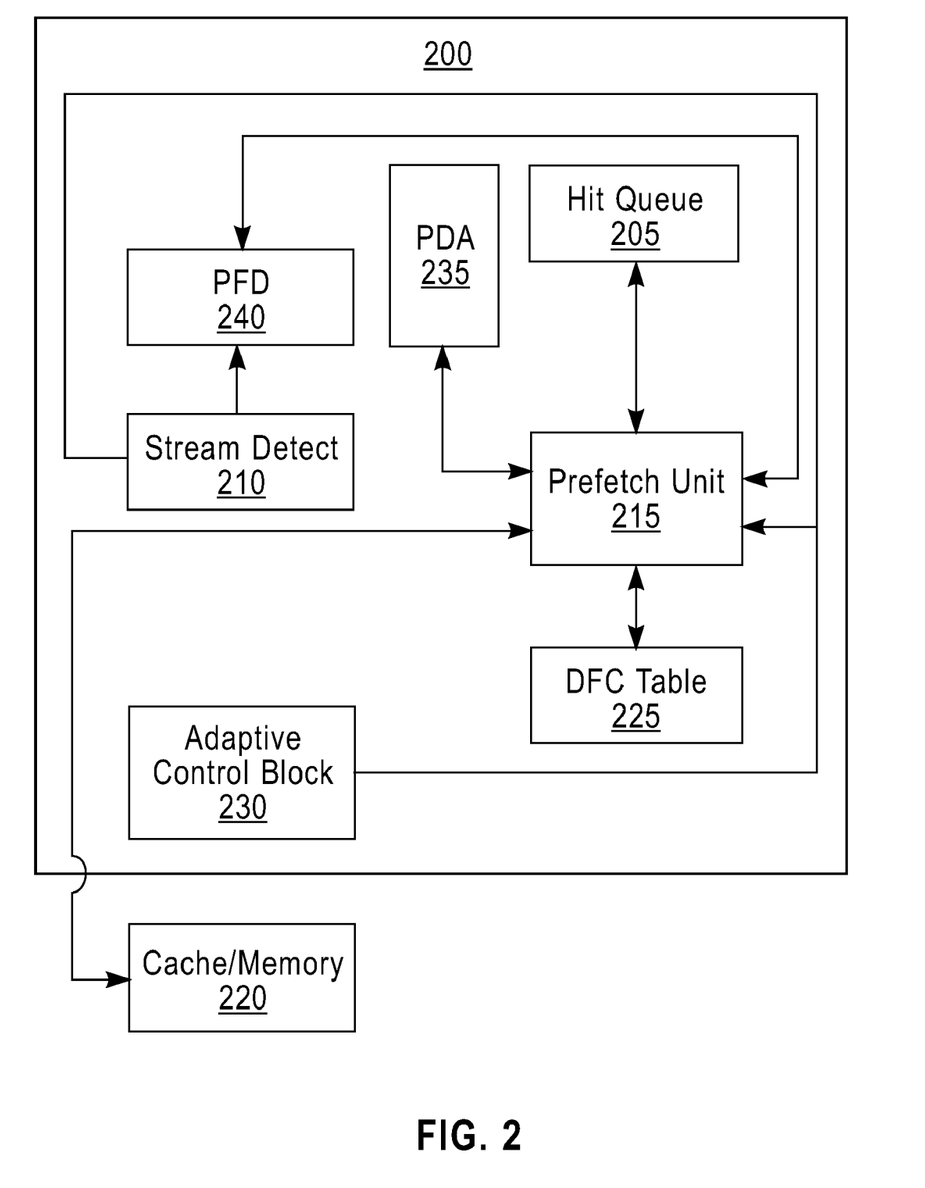
FIG. 2 illustrates a system diagram of a stream prefetch engine in one embodiment.

FIG. 2 illustrates a system diagram of a stream prefetch engine 200 in one embodiment. The stream prefetch engine 200 includes, but is not limited to, a first table 240 called prefetch directory, an array or buffer 235 called prefetch data array, a queue 205 call hit queue, a stream detect engine 210, a prefetch unit 215, a second table 225 called DFC (Demand Fetch Conversion) table, a third table 230 called adaptive control block. These tables 240, 225 and 230 may be implemented as any data structure including, but is not limited to, an array, buffer, list, queue, vector, etc. The stream prefetch engine 200 is capable of maintaining a plurality of active streams of varying prefetching depths. An active stream refers to a stream being processed by a processor core. A prefetching depth refers to the number of instructions or an amount of data to be prefetched ahead (e.g., 10 clock cycles before the instructions or data are needed by a processor core). The stream prefetch engine 200 dynamically adapts prefetching depths of streams being prefetched, e.g., according to method steps illustrated in FIG. 2. These method steps in FIG. 2 are described in detail below.

The prefetch directory (PFD) 240 stores tag information (e.g., valid bits) and meta data associated with each cache line stored in the prefetch data array (PDA) 235. The prefetch data array 235 stores cache lines (e.g., L2 (Level two) cache lines and/or L1 (Level one) cache lines) prefetched, e.g., by the stream prefetch unit 200. In one embodiment, the stream prefetch engine 200 supports diverse memory latencies and a large number (e.g., 1 million) of active threads run in the parallel computing system. In one embodiment, the stream prefetching makes use of the prefetch data array 235 which holds up to, for example, 32 128-byte level-two cache lines.

In one embodiment, an entry of the PFD 240 includes, but is not limited to, an address valid (AVALID) bit(s), a data valid (DVALID) bit, a prefetching depth (DEPTH) of a stream, a stream ID (Identification) of the stream, etc. An address valid bit indicates whether the PFD 240 has a valid cache line address corresponding to a memory address requested in a load request issued by the processor. A valid cache line address refers to a valid address of a cache line. A load request refers to an instruction to move data from a memory device to a register in a processor. When an address is entered as valid into the PFD 240, corresponding data may be requested from a memory device but may be not immediately received. The data valid bit indicates whether the stream prefetch engine 200 has received data corresponding to a AVALID bit from a memory device 220. In other words, DVALID bit is set to low ("0") to indicate pending data, i.e., the data that has been requested to the memory device 220 but has not been received by the prefetch unit 215. When the prefetch unit 215 establishes an entry in the prefetch directory 240 with setting the AVALID bit to high ("1") to indicate the entry has a valid cache line address corresponding to a memory address requested in a load request, the prefetch unit 215 may also request corresponding data (e.g., L1 or L2 cache line corresponding to the memory address) from a memory device 220 (e.g., L1 cache memory device, L2 cache memory device, a main memory device, etc.) and set corresponding DVALID bit to low. When a AVALID bit is set to high and a corresponding DVALID bit is set to low, the prefetch unit 215 places a corresponding load request associated with these AVALID and DVALID bits in the DFC table 225 to wait until the corresponding data that is requested by the prefetch unit 215 comes from the memory device 220. Once the corresponding data arrives from the memory device 220, the stream prefetch engine 200 stores the data in the PDA 235 and sets the DVALID bit to high in a corresponding entry in the PFD 240. Then, the load request, for which there exists a valid cache line in the PDA 235 and a valid cache line address in the PFD 240, are forwarded to the hit queue 205, e.g., by the prefetch unit 215. In other words, once the DVALID bit and the AVALID bit are set to high in an entry in the PFD 240, a load request associated with the entry is forwarded to the hit queue 205.

A valid address means that a request for the data for this address has been sent to a memory device, and that the address has not subsequently been invalidated by a cache coherence protocol. Consequently, a load request to that address may either be serviced as an immediate hit, for example, to the PDA 235 when the data has already been returned by the memory device (DVALID=1), or may be serviced as a demand fetch conversion (i.e., obtaining the data from a memory device) with the load request placed in the DFC table 225 when the data is still in flight from the memory device (DVALID=0).

Valid data means that an entry in the PDA 235 corresponding to the valid address in the PFD 240 is also valid. This entry may be invalid when the data is initially requested from a memory device and may become valid when the data has been returned by the memory device.

In one embodiment, the stream fetch engine 200 is triggered by hits in the prefetch directory 240. As a prefetching depth can vary from a stream to another stream, a stream ID field (e.g., 4-bit field) is held in the prefetch directory 240 for each cache line. This stream ID identifies a stream for which this cache line was prefetched and is used to select an appropriate prefetching depth.

A prefetch address is computed, e.g., by selecting the first cache line within the prefetching depth that is not resident (but is a valid address) in the prefetch directory 240. A prefetch address is an address of data to be prefetched. As this address is dynamically selected from a current state of the prefetch directory 240, duplicate entries are avoided, e.g., by comparing this address and addresses that stored in the prefetch directory 240. Some tolerance to evictions from the prefetch directory 240 is gained.

An actual data prefetching, e.g., guided by the prefetching depth, is managed as follows: When a stream is detected, e.g., by detecting subsequent cache line misses, a sequence of "N" prefetch requests is issued in "N" or more clock cycles, where "N" is a predetermined integer between 1 and 8. Subsequent hits to this stream (whether or not the data is already present in the prefetch data array 235) initiate a single prefetch request, provided that an actual prefetching depth of this stream is less than its allowed depth. Increases in this allowed depth (caused by hits to cache lines being prefetched but not yet resident in the prefetch data array 235) can be exploited by this one-hit/one-prefetch policy because the prefetch line length is twice the L1 cacheline length: two hits will occur to the same prefetch line for sequential accesses. This allows two prefetch lines to be prefetched for every prefetch line consumed and depth can be extended. One-hit/one-prefetch policy refers to a policy initiating a prefetch of data or instruction in a stream per a hit in that stream.

The prefetch unit 215 stores in a demand fetch conversion (DFC) table 225 a load request for which a corresponding cache line has an AVALID bit set to high but a DVALID bit not (yet) set to high. Once a valid cache line returns from the memory device 220, the prefetch unit 215 places the load request into the hit queue 205. In one embodiment, a switch (not shown) provides the data to the prefetch unit 215 after the switch retrieves the data from the memory device. This (i.e., receiving data from the memory device or the switch and placing the load request in the hit queue 205) is known as demand fetch conversion (DFC). The DFC table 225 is sized to match a total number of outstanding load requests supported by a processor core associated with the stream prefetch engine 200.

In one embodiment, the demand fetch conversion (DFC) table 225 includes, but is not limited to, an array of, for example, 16 entries×13 bits representing at least 14 hypothetically possible prefetch to demand fetch conversions. A returning prefetch from the switch is compared against this array. These entries may arbitrate for access to the hit queue, waiting for free clock cycles. These entries wait until the cache line is completely entered before requesting an access to the hit queue.

Figure 1:
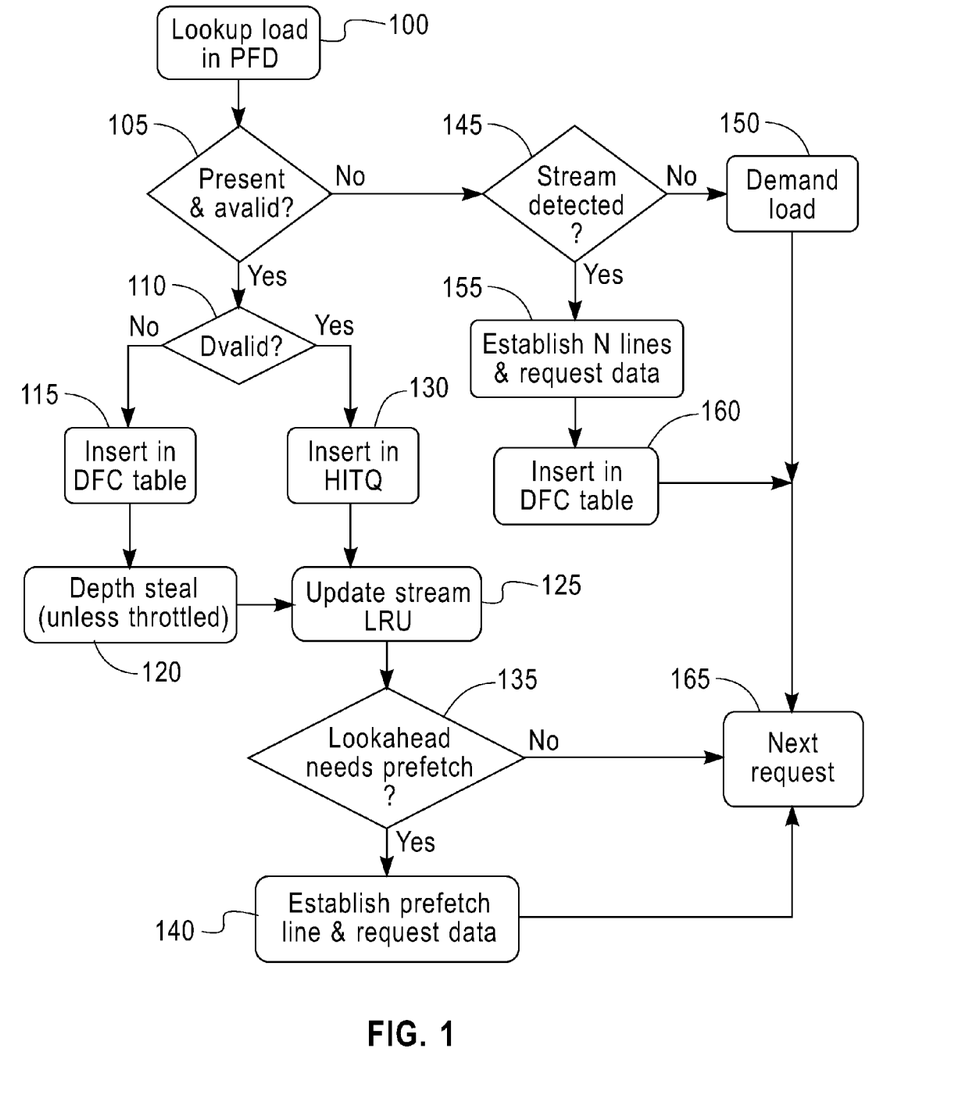
FIG. 1 illustrates a flow chart illustrating method steps performed by a stream prefetch engine in one embodiment.

In one embodiment, the prefetch unit 215 is tied quite closely to the prefetch directory 240 on which the prefetch unit 215 operates and is implemented as part of the prefetch directory 240. The prefetch unit 215 generates prefetch addresses for a data or instruction stream prefetch. If a stream ID of a hit in the prefetch directory 240 indicates a data or instruction stream, the prefetch unit 275 processes address and data vectors representing "hit", e.g., by following steps 110-140 in FIG. 2.

When either a hit or DFC occurs, the next "N" cache line addresses may be also matched in the PFD 240 where "N" is a number described in the DEPTH field of a cache line that matched with the memory address. A hit refers to finding a match between a memory address requested in a load request and a valid cache line address in the PFD 240. If a cache line within the prefetching depth of a stream is not present in the PDA 235, the prefetch unit 215 prefetches the cache line from a cache memory device (e.g., a cache memory 220). Before prefetching the cache line, the prefetch unit 215 may establish a corresponding cache line address in the PFD 240 with AVALID bit set to high. Then, the prefetch unit 215 requests data load from the cache memory device 220. Data load refers to reading the cache line from the cache memory device 220. When prefetching the cache line, the prefetch unit 215 assigns to the prefetched cache line a same stream ID which is inherited from a cache line whose address was hit. The prefetch unit 215 looks up a current prefetching depth of that stream ID in the adaptive control block 230 and inserts this prefetching depth in a corresponding entry in the PFD 240 which is associated with the prefetched cache line. The adaptive control block 230 is described in detail below.

The stream detect engine 210 memorizes a plurality of memory addresses that caused cache misses before. In one embodiment, the stream detect engine 210 memories the latest sixteen memory addresses that causes load misses. Load misses refer to cache misses caused by load requests. If a load request demands an access to a memory address which resides in a next cache line of a cache line that caused a prior cache miss, the stream detect engine 210 detects a new stream and establishes a stream. Establishing a stream refers to prefetching data or instruction in the stream according to a prefetching depth of the stream. Prefetching data or instructions in a stream according to a prefetch depth refers to fetching a certain number of instructions or a certain amount of data in the stream within the prefetching data before they are needed. For example, if the stream detect engine 210 is informed a load from "M1" memory address is a missed address, it will memorise the corresponding cacheline "C1". Later, if a processor core issues a load request reading data in "M1+N" memory address and "M1+N" address corresponds to a cache line "C1+1" which is subsequent to the cache line "C1", the stream detect engine 210 detects a stream which includes the cache line "C1", the cache line "C1+1", a cache line "C1+2", etc. Then, the prefetch unit 215 fetches "C1+1" and prefetches subsequent cache lines (e.g., the cache line "C1+2", a cache line "C1+3," etc.) of the stream detected by the stream detect engine 210 according to a prefetching depth of the stream. In one embodiment, the stream detect engine establishes a new stream whenever a load miss occurs. The number of cache lines established in the PFD 240 by the stream detect engine 210 is programmable.

In one embodiment, the stream prefetch engine 200 operates three modes where a stream is initiated on each of the following events:

Automatic stream detection (e.g., a step 145 in FIG. 1); This mode is described in detail below in conjunction with FIG. 1.

User DCBT (Data Cache Block Touch) instruction that misses in the stream prefetch engine 200. This DCBT instruction refers to an instruction that may move a cache line from a lower level cache memory device (e.g., L1 cache memory device) into a higher level cache memory (e.g., L2 cache memory device). This instruction may allow the stream prefetch engine 200 to interpret the instruction as a hint to establish a stream in the stream prefetch engine 200.

Optimistic mode where a stream is established for any load miss.

Each of these modes can be enabled/disabled independently via MMIO (Memory-mapped I/O) registers. The optimistic mode and DCBT instruction share hardware logic (not shown) with the stream detect engine 210. In order for a use of the DCBT instruction, which is only effective to a L2 cache memory device and does not unnecessarily fill a load queue (i.e., a queue storing load requests) in a processor core, the stream prefetch engine 200 may trigger an immediate return of dummy data allowing the DCBT instruction to be retired without incurring latency associated with a normal extraction of data from a cache memory device as this DCBT instruction only affects a L2 cache memory operation and the data may not be held in a L1 cache memory device by the processor core. A load queue refers to a queue for storing load requests.

In one embodiment, the stream detect engine 210 is performed by comparing all cache misses to a table of at least 16 expected 128-byte cache line addresses. A hit in this table triggers a number n of cache lines to be established in the prefetch directory 240 on the following n clock cycles. A miss in this table causes a new entry to be established with a round-robin victim selection (i.e., selecting a cache line to be replaced in the table with a round-robin fashion).

In one embodiment, a prefetching depth does not represent an allocation of prefetched cache lines to a stream. The stream prefetch engine 200 allows elasticity (i.e., flexibility within certain limits) that can cause this depth to differ (e.g., by up to 8) between streams. For example, when a processor core 200 aggressively issues load requests, the processor core can catch up with a stream, e.g., by hitting prefetched cache lines whose data has not yet been returned by the switch. These prefetch-to-demand fetch conversion cases may be treated as normal hits by the stream detect engine 210 and additional cache lines are established and fetched. A prefetch-to-demand fetch conversion case refers to a case in which a hit on a line that has been established in the prefetch directory 240 but not yet had data returned from a switch or a memory device. Thus, the number of prefetch lines used by a stream in the prefetch directory 240 can exceed the prefetching depth of a stream. However, the stream prefetch engine 200 will have the number of cache lines for each stream equal to that stream's prefetching depth once all pending requests are satisfied and the elasticity removed.

The adaptive control block 230 includes at least two data structures: 1. Depth table storing a prefetching depth of each stream which are registered in the PFD 240 with its stream ID; 2. LRU (Least Recently Used) table indentifying the least recently used streams among the registered streams, e.g., by employing a known LRU replacement algorithm. The known LRU replacement algorithm may update the LRU table whenever a hit in an entry in the PFD 240 and/or DFC (Demand Fetch Conversion) occurs. In one embodiment, when a DFC occurs, the stream prefetch engine 200 increments a prefetching depth of a stream associated with the DFC.

This increment allows a deep prefetch (e.g., prefetching data or instructions in a stream according to a prefetching depth of 8) to occur when only one or two streams are being prefetched, e.g., according to a prefetching depth of up to 8. Prefetching data or instructions according to a prefetching depth of a stream refers to fetching data or instructions in the stream within the prefetching depth ahead. For example, if a prefetching depth of a stream which comprises data stored in "K" cache line address, "K+1" cache line address, "K+2" cache line address, . . . , and "K+1000" cache line address is a depth of 2 and the stream detect engine 200 detects this stream when a processor core requests data in "K1+1" cache line address, then the stream prefetch engine 200 fetches data stored in "K+1" cache line address and "K1+2" cache line address. In one embodiment, an increment of a prefetching depth is only made in response to an indicator that loads from a memory device for this stream are exceeding the rate enabled by a current prefetching depth of the stream. For example, although the stream prefetch engine 200 prefetches data or instructions, the stream may face demand fetch conversions because the stream prefetch engine 200 fails to prefetch enough data or instructions ahead. Then, the stream prefetch engine 200 increases the prefetching depth of the stream to fetch data or instruction further ahead for the stream. A load refers to reading data and/or instructions from a memory device. However, by only doing this increase in response to an indicator of data starvation, the stream prefetch engine 200 avoids unnecessary deep prefetch. For example, when only hits (e.g., a match between an address in a current load request and an address in the PFD 240) are taken, a prefetching depth of a stream associated with the current cache miss address is not increased. Unless PFD 240 has a AVALID bit set to high and a corresponding DVALID bit set to low, the prefetch unit 125 may not increase a prefetching depth of a corresponding stream. Because depth is stolen in competition with other active streams, the stream prefetch engine 200 can also automatically adapt to optimally support concurrent data or instruction streams (e.g., 16 concurrent streams) with a small storage capability (e.g., a storage capacity storing only 32 cache lines) and a shallow prefetching depth (e.g., a depth of 2) for each stream.

As a capacity of the PDA 235 is limited, it is essential that active streams do not try to exceed the capacity (e.g., 32 L2 cache lines) of the PDA 235 to prevent thrashing and substantial performance degradation. This capacity of the PDA 235 is also called a capacity of the stream prefetch engine 200. The stream prefetch engine adaptation algorithm 200 constrains a total depth of all streams across all the streams to remain as a predetermined value.

When incrementing a prefetching depth of a stream, the stream prefetch engine 200 decrements a prefetching depth of a victim stream. A victim stream refers to a stream which is least recently used and has non-zero prefetching depth. Whenever a current active stream needs to acquire one more unit of its prefetching depth (e.g., a depth of 1), the victim stream releases one unit of its prefetching depth, thus ensuring the constraint is satisfied by forcing streams to compete for their prefetching depth increments. The constraint includes, but is not limited to: fixing a total depth of all streams.

In one embodiment, there is provided a victim queue (not shown) implemented, e.g., by a collection of registers. When a stream of a given stream ID is hit, that stream ID is inserted at a head of the victim queue and a matching entry is eliminated from the victim queue. The victim queue may list streams, e.g., by a reverse time order of an activity. A tail of this victim queue may thus include the least recently used stream. A stream ID may be used when a stream is detected and a new stream reinserted in the prefetch directory 240. Stale data is removed from the prefetch directory 240 and corresponding cache lines are freed.

The stream prefetch engine 200 may identify the least recently used stream with a non-zero depth as a victim stream for decrementing a depth. An empty bit in addition to stream-ID is maintained in a LRU (Least Recently Used) queue (e.g., 16×5 bit register array). The empty bit is set to 0 when a stream ID is hit and placed at a head of the queue. If decrementing a prefetching depth of a victim stream results in a prefetching depth of the victim stream becoming zero, the empty bit of the victim stream is set to 1. A stream ID of a decremented-to-zero-depth stream is distributed to the victim queue. One or more comparator(s) matches this stream ID and sets the empty bit appropriately. A decremented-to-zero-depth stream refers to a stream whose depth is decremented to zero.

In one embodiment, a free depth register is provided for storing depths of invalidated streams. This register stores a sum of all depth allocations matching the capacity of the prefetch data array 235, ensuring a correct book keeping.

In one embodiment, the stream prefetch engine 100 may require elapsing a programmable number of clock cycles between adaptation events (e.g., the increment and/or the decrement) to rate control such adaptation events. For example, this elapsing gives a tunable rate control over the adaptation events.

In one embodiment, the Depth table does not represent an allocation of a space for each stream in the PDA 235. As the prefetch unit 215 changes a prefetching depth of a stream, a current prefetching depth of the stream may not immediately reflect this change. Rather, if the prefetch unit 215 recently increased a prefetching depth of a stream, the PFD 240 may reflect this increase after the PFD 240 receives a request for this increase and prefetched data of the stream is grown. Similarly, if the prefetch unit 215 decreases a prefetching depth of a stream, the PFD 240 may include too much data (i.e., data beyond the prefetching depth) for that stream. Then, when a processor core issues subsequent load requests for this stream, the prefetch unit 215 may not trigger further prefetches and at a later time an amount of the prefetched data may represent a shrunk depth. In one embodiment, the Depth table includes a prefetching depth for each stream. An additional counter is implemented as the free depth register for spare prefetching depth. This free depth register can semantically be thought of as a dummy stream and is essentially treated as a preferred victim for purposes of depth stealing. In one embodiment, invalidated stream IDs return their depths to this free depth register. This return may require a full adder to be implemented in the free depth register.

If a look-up address hits in the prefetch directory 240, a prefetch is generated for the lowest address that is within a prefetching depth of a stream ID associated with the look-up address and which misses, for example, an eight-bit lookahead vector over the next 8 cache line addresses identifying which of these are already present in PFD 240. A look-up address refers to an address associated with a request or command. A condition called underflow occurs when the look-up address is present with a valid address (and hence has been requested from a memory device) but corresponding data has not yet become valid. This underflow condition triggers a hit stream to increment its depth and decrement a depth of a current depth of a victim stream. A hit stream refers to a stream whose address is found in the prefetch directory 240. As multiple hits can occur for each prefetched cache line, depths of hit streams can grow dynamically. The stream prefetch engine 200 keeps a capacity of foot prints of all or some streams fixed, avoiding many pathological performance conditions that the dynamic growing could introduce. In one embodiment, the stream prefetch engine 200 performs a less aggressive prefetch, e.g., by stealing depths from less active streams.

Due to outstanding load requests issued from a processor core, there is elasticity between issued requests, and those queued, pending or returned. Thus, even with the algorithm described above, a capacity of the stream prefetch engine 200 can be exceeded by additional 4, 6 or 12 requests. The prefetching depths may be viewed as a "drive to" target depths whose sum is constrained not to exceed the capacity of a cache memory device when the processor core has no outstanding loads tying up slots of the cache memory. While the PFD 240 does not immediately or automatically include precisely the number of cache lines for each stream corresponding to the depth of each stream, the stream prefetch engine 200 makes its decisions about when to prefetch to try to get closer to a prefetching depth (drives towards it).

FIG. 1 illustrates a flow chart illustrating method steps performed by a stream prefetch engine (e.g., a stream prefetch engine 200 in FIG. 2) in a parallel computing system in one embodiment. A stream prefetch engine refers to a hardware or software module for performing fetching of data in a plurality of streams before the data is needed. The parallel computing system includes a plurality of computing nodes. A computing node includes at least one processor and at least one memory device. At step 100, a processor issues a load request (e.g., a load instruction). The stream prefetch engine 200 receives the issued load request. At step 105, the stream prefetch engine searches the PFD 240 to find a cache line address corresponding to a first memory address in the issued load request. In one embodiment, the PFD 240 stores a plurality of memory addresses whose data have been prefetched, or requested to be prefetched, by the stream prefetch engine 200. In this embodiment, the stream prefetch engine 200 evaluates whether the first address in the issued load request is present and valid in the PFD 240. To determine whether a memory address in the PFD 240 is valid or not, the stream prefetch engine 200 may check an address valid bit of that memory address.

If the first memory address is present and valid in the PFD 240 or there is a valid cache line address corresponding to the first memory address in the PFD 240, at step 110, the stream prefetch engine 200 evaluates whether there exists valid data (e.g., valid L2 cache line) corresponding to the first memory address in the PDA 235. In other words, if there is a valid cache line address corresponding to the first memory address in the PFD 240, the stream prefetch engine 200 evaluates whether the corresponding data is valid yet. If the data is not valid, then the corresponding data is pending, i.e., corresponding data is requested to the memory device 220 but has not been received by the stream prefetch engine 200. At step 105, if the first memory address is not present or not valid in the PFD 240, the control goes to step 145. At step 110, to evaluate whether there already exists the valid data in the PDA 235, the stream prefetch engine 200 may check a data valid bit associated with the first memory address or the valid cache line address in the PFD 240.

If there is no valid data corresponding to the first memory address in the PDA 235, at step 115, the stream prefetch engine 200 inserts the issued load request to the DFC table 225 and awaits a return of the data from the memory device 200. Then, the control goes to step 120. In other words, if the data is pending, at step 115, the stream prefetch engine 200 inserts the issued load request to the DFC table 225, the stream prefetch engine 200 awaits the data to be returned by the memory device (since the address was valid, the data has already been requested but not returned) and the control goes to step 120. Otherwise, the control goes to step 130. At step 120, the stream prefetch engine 200 increments a prefetching depth of a first stream that the first memory address belongs to. While incrementing the prefetching depth of the first stream, at step 125, the stream prefetch engine 200 determines a victim stream among streams registered in the PFD 240 and decrements a prefetching depth of the victim stream. The registered streams refers to streams whose stream IDs are stored in the PFD 240. To determine the victim stream, the stream prefetch engine 200 searches the least recently used stream having non-zero prefetching depth among the registered streams. The stream prefetch engine 200 sets the least recently used stream having non-zero prefetching depth as the victim stream in a purpose of a reallocation of a prefetching depth of the victim stream.

In one embodiment, a total prefetching depth of the registered streams is a predetermined value. The parallel computing system operating the stream prefetch engine 200 can change or program the predetermined value representing the total prefetching depth.

Returning to FIG. 1, at step 135, the stream prefetch engine 200 evaluates whether prefetching of additional data (e.g., subsequent cache lines) is needed for the first stream. For example, the stream prefetch engine 200 perform parallel address comparisons to check whether all memory addresses or cache line addresses within a prefetching depth of the first stream are present in the PFD 240. If all the memory addresses or cache line addresses within the prefetching depth of the first stream are present, i.e., all the cache line addresses within the prefetching depth of the first stream are present and valid in the PFD 240, then the control goes to step 165. Otherwise, the control goes to step 140.

At step 140, the stream prefetch engine 200 prefetches the additional data. Upon determining that prefetching of additional data is necessary, the stream prefetch engine 200 may select the nearest address to the first address that is not present but is a valid address in the PFD 240 within a prefetching depth of a stream corresponding to the first address and starts to prefetch data from the nearest address. The stream prefetch engine 200 may also prefetch subsequent data stored in subsequent addresses of the nearest address. The stream prefetch engine 200 may fetch at least one cache line corresponding to a second memory address (i.e., a memory address or cache line address not being present in the PFD 240) within the prefetching depth of the first stream. Then, the control goes to step 165.

At step 145, the stream prefetch engine 200 attempts to detect a stream (e.g., the first stream that the first memory address belongs to). In one embodiment, the stream prefetch engine 200 stores a plurality of third memory addresses that caused load misses before. A load miss refers to a cache miss caused by a load request. The stream prefetch engine 200 increments the third memory addresses. The stream prefetch engine 200 compares the incremented third memory addresses and the first memory address. The stream prefetch engine 200 identifies the first stream if there is a match between an incremented third memory address and the first memory address.

If the stream prefetch engine 200 succeeds to detect a stream (e.g., the first stream), at step 155, the stream prefetch engine 200 starts to prefetch data and/or instructions in the stream (e.g., the first stream) according to a prefetching depth of the stream. Otherwise, the control goes to step 150. At step 150, the stream prefetch engine 200 returns prefetched data and/or instructions to a processor core. The stream prefetch engine 200 stores the prefetched data and/or instructions, e.g., in PDA 235, before returning the prefetched data and/or instructions to the processor core. At step 160, the stream prefetch engine 200 inserts the issued load request to the DFC table 225. At step 165, the stream prefetch engine receives a new load request issued from a processor core.

In one embodiment, the stream prefetch engine 200 adaptively changes prefetching depths of streams. In a further embodiment, the stream prefetch engine 200 sets a minimum prefetching depth (e.g., a depth of zero) and/or a maximum prefetching depth (e.g., a depth of eight) that a stream can have. The stream prefetch engine 200 increments a prefetching depth of a stream associated with a load request when a memory address in the load request is valid (e.g., its address valid bit has been set to high in the PFD 240) but data (e.g., L2 cache line stored in the PDA 235) corresponding to the memory address is not yet valid (e.g., its data valid bit is still set to low ("0") in the PFD 240). In other words, the stream prefetch engine 200 increments the prefetching depth of the stream associated with the load request when there is no valid cache line data present in the PDA 235 corresponding to the valid memory address in the PFD (due to the data being in flight from the cache memory). To increment the prefetching depth of the stream, the stream prefetch engine 200 decrements a prefetching depth of the least recently used stream having non-zero prefetching depth. For example, the stream prefetch engine 200 first attempts to decrement a prefetching depth of the least recently used stream. If the least recently used stream already has zero prefetching depth (i.e., a depth of zero), the stream prefetch engine 200 attempts to decrement a prefetching depth of a second least recently used stream, and so on. In one embodiment, as described above, the adaptive control block 230 includes the LRU table that traces least recently used streams according to hits on streams.

In one embodiment, the stream prefetch engine 200 may be implemented in hardware or reconfigurable hardware, e.g., FPGA (Field Programmable Gate Array) or CPLD (Complex Programmable Logic deviceDevice), using a hardware description language (Verilog, VHDL (Very-high-speed integrated circuits Hardware Description Language), Handel-C, or System C).

In another embodiment, the stream prefetch engine 200 may be implemented in a semiconductor chip, e.g., ASIC (Application-Specific Integrated Circuit), using a semi-custom design methodology, i.e., designing a chip using standard cells and a hardware description language. In one embodiment, the stream prefetch engine 200 may be implemented in a processor (e.g., IBM® PowerPC® processor, etc.) as a hardware unit(s). In another embodiment, the stream prefetch engine 200 may be implemented in software (e.g., a compiler or operating system), e.g., by a programming language (e.g., Java ®, C/C++, .Net, Assembly language(s), Pearl, etc.).

In one embodiment, the stream prefetch engine 200 operates with at least four threads per processor core and a maximum prefetching depth of eight (e.g., eight L2 (level two) cache lines).

In one embodiment, the prefetch data array 235 may store 128 cache lines. In this embodiment, the prefetch data array stores 32 cache lines and, by adapting the prefetching depth according to a system load, the stream prefetch engine 200 can support the same dynamic range of memory accesses. By adaptively changing the capacity of the PDA 235, the prefetch data array 235 whose capacity is 32 cache lines can also operate as an array with 128 cache lines.

In one embodiment, an adaptive prefetching is necessary to both support efficient low stream count (e.g., a single stream) and efficient high stream count (e.g., 16 streams) prefetching with the stream prefetch engine 200. An adaptive prefetching is a technique adaptively adjusting prefetching depth per a stream as described in the steps 120-125 in FIG. 1.

In one embodiment, the stream prefetch engine 200 counts the number of active streams and then divides the PFD 240 and/or the FDA 235 equally among these active streams. These active streams may have an equal prefetching depth.

In one embodiment, a total depth of all active streams is predetermined and not exceeding a PDA capacity of the stream prefetch engine 100 to avoid thrashing. An adaptive variation of a prefetching depth allows a deep prefetch (i.e., a depth of eight) for low numbers of streams (i.e., two streams), while a shallow prefetch (i.e., a depth of 2) is used for large numbers of streams (i.e., 16 streams) to maintain the usage of PDA 235 optimal under a wide variety of load requests.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, . Net, Binary code) run by a processor (e.g., Intel Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention. The present invention may also include a computer program product for one or more functions of this invention. The computer program product includes a storage medium (e.g., a disk, optical disc, memory device, solid-state drive, etc.) readable by a processing circuit and storing instructions run by the processing circuit for performing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It may be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for performing data retrieval in a parallel computing system, the parallel computing system including a plurality of computing nodes, a computing node including at least one processor and at least one cache memory device, the method comprising:

receiving a load request from a processor in the computing node;

evaluating whether a first memory address requested in the load request is present and valid in a first table;

checking whether there exists valid data corresponding to the first memory address in an array in response to determining that the first memory address is present and valid in the first table;

inserting the load request in a second table while awaiting the valid data to be returned by a cache memory device in the computing node in response to determining that there is not yet valid data corresponding to the first memory address in the array;

determining a victim stream among streams registered in the first table;

decrementing a prefetching depth of the victim stream;

incrementing a prefetching depth of a first stream that the first memory address belongs to;

determining whether prefetching of additional data is needed for the first stream; and prefetching the additional data in response to determining that the prefetching is needed.

2. The method according to claim 1, wherein the evaluating comprises:

checking an address valid bit associated with the first memory address in the first table, the address valid bit indicating whether the first table has a valid cache line address corresponding to the first memory address.

3. The method according to claim 2, wherein the checking whether there exists valid data comprises:

evaluating a data valid bit associated with the first memory address in the first table, the data valid bit indicating whether the array has already obtained a valid cache line corresponding to the first memory address.

4. The method according to claim 1, wherein an entry in the first table comprises one or more of: the address valid bit, the data valid bit, the prefetching depth of the first stream, a stream ID (Identification) of the first stream.

5. The method according to claim 1, wherein the determining the victim stream comprises:

searching for a least recently used stream having a non-zero prefetching depth among the registered streams; and setting the least recently used stream as the victim stream for reallocating the prefetching depth of the victim stream.

6. The method according to claim 1, wherein a total prefetching depth of the registered streams is a predetermined value.

7. The method according to claim 6, wherein the predetermined value can be changed by the parallel computing system.

8. The method according to claim 1, wherein determining whether prefetching of additional data is needed comprises:

evaluating whether all memory addresses within the prefetching depth of the first stream are present in the first table;

fetching at least one cache line corresponding to a second memory address within the prefetching depth of the first stream, the second memory address not being present in the first table.

9. The method according to claim 1, further comprising: detecting the first stream.

10. A method for adjusting a prefetching depth of a stream in a stream prefetch engine, the method comprising:

determining whether a load request for the stream has an address associated with the request in a first table;

determining whether the stream prefetch engine has received data associated with the request from a memory device;

incrementing the prefetching depth of the stream in response to determining that there exists the address in the first table but the stream prefetch engine has not received the data from a memory device; and decrementing a prefetching depth of a victim stream upon the incrementing, the victim stream referring to a least recently used stream.

11. An apparatus for performing data retrieval in a parallel computing system, the parallel computing system including a plurality of computing nodes, a computing node including at least one processor and at least one cache memory device, the apparatus comprising:

a processor, in the computing node, issuing a load request;

a prefetch unit operable to evaluate whether a first memory address requested in the load request is present and valid in a first table, to check whether there already exists valid data corresponding to the first memory address in a prefetch data array in response to determining that the first memory address is present and valid in the first table, to insert the load request in a second table while awaiting the valid data to be returned by a cache memory device in the computing node in response to determining that there is not yet valid data corresponding to the first memory address in the array, to determine a victim stream among streams registered in the first table, to decrement a prefetching depth of the victim stream, to increment a prefetching depth of a first stream that the first memory address belongs to, to determine whether prefetching of additional data is needed for the first stream, and to prefetch the additional data in response to determining that the prefetching is needed.

12. The apparatus according to claim 11, wherein the prefetch unit is further operable to check an address valid bit associated with the first memory address in the first table, the address valid bit indicating whether the first table has a valid cache line address corresponding to the first memory address.

13. The apparatus according to claim 12, wherein the prefetch unit is further operable to evaluate a data valid bit associated with the first memory address in the first table, the data valid bit indicating whether the array has already obtained a valid cache line corresponding to the first memory address.

14. The apparatus according to claim 13, wherein an entry in the first table comprises one or more of: the address valid bit, the data valid bit, the prefetching depth of the first stream, a stream ID (Identification) of the first stream.

15. The apparatus according to claim 11, wherein the prefetch unit is further operable to search for a least recently used stream having a non-zero prefetching depth among the registered streams and to set the least recently used stream as the victim stream for reallocating a prefetching depth of the victim stream.

16. The apparatus according to claim 11, wherein a total prefetching depth of the registered streams is a predetermined value.

17. The apparatus according to claim 16, wherein the predetermined value can be changed by the parallel computing system.

18. The apparatus according to claim 11, wherein the prefetch unit is further operable to evaluate whether all memory addresses within the prefetching depth of the first stream are present in the first table and to fetch at least one cache line corresponding to a second memory address within the prefetching depth of the first stream, the second memory address not being present in the first table.

19. The apparatus according to claim 11, further comprising:
 a stream detect engine for detecting the first stream.

20. A computer program product for performing data retrieval in a parallel computing system, the computer program product comprising a storage medium readable by a processing circuit and storing instructions run by the processing circuit for performing method steps of:

receiving a load request from a processor in the computing node;

evaluating whether a first memory address requested in the load request is present and valid in a first table;

checking whether there exists valid data corresponding to the first memory address in an array in response to determining that the first memory address is present and valid in the first table;

inserting the load request in a second table while awaiting the valid data to be returned by a cache memory device in the computing node in response to determining that there is not yet valid data corresponding to the first memory address in the array;

determining a victim stream among streams registered in the first table;

decrementing a prefetching depth of the victim stream;

incrementing a prefetching depth of a first stream that the first memory address belongs to;

determining whether prefetching of additional data is needed for the first stream; and prefetching the additional data in response to determining that the prefetching is needed.

\* \* \* \* \*